Patented Dec. 22, 1942

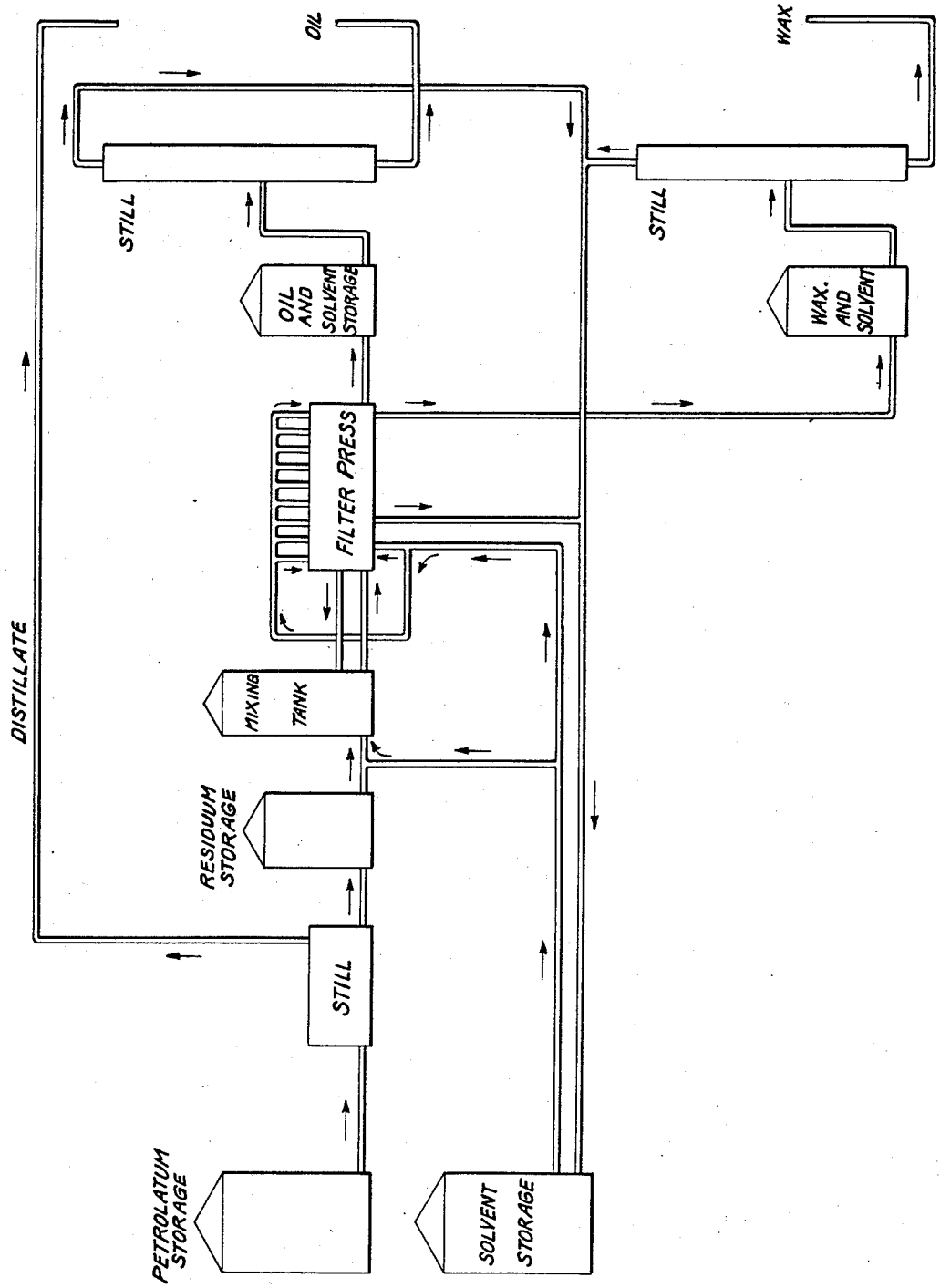

2,306,201

UNITED STATES PATENT OFFICE 2,306,201

HIGH MELTING POINT WAX

Everett R. Wiles, Barnsdall, Okla., assignor to Bareco Oil Company, Tulsa, Okla., a corporation of Delaware Application June 3, 1939, Serial No. 277,221

4 Claims. (Cl. 196—149)

The present invention relates to high melting point waxes which may be derived from petroleum, by means of the process disclosed in my United States Patent No. 2,123,982, granted July 19, 1938. The present application is a continuation-in-part of my application Serial No. 114,753, filed December 8, 1936, which is, in turn, a division of application Serial No. 66,445, now Patent No. 2,123,982.

Prior types of high melting point waxes have, in common, the disadvantage of being comparatively non-adhesive, brittle and hard when their temperature is reduced to about 30° F. While these characteristics may not adversely affect the use of such waxes for many purposes when high melting point, only, is required, there are many other uses to which they cannot be put. For example, such hard and brittle high melting point waxes cannot be used satisfactorily for lining metallic containers for beverages or foodstuffs which are chilled to low temperature, for the reason that the waxes will crack or break away from the walls of the containers and thus expose the metal and cause undesirable flavors to develop in the contents.

If attempts are made to reduce the brittleness of the waxes by adding oil or other diluent, the melting points of the waxes are lowered and they become tacky or sticky. Furthermore, the oil prevents their use under conditions where the waxes may be brought into contact with materials which may be stained or given "off" flavors.

An object of the present invention is to provide high melting point waxes which are oil-free and are ductile and adhesive at lower temperatures, without being sticky or tacky at normal temperature or even above.

Another object of the invention is to provide oil-free waxes having melting points of 155° F. and above, which are ductile and will adhere to metal over a wide range of temperatures.

Waxes embodying the present invention are derived from petrolatum and are characterized by having melting points of 155° F. or above, and even though oil-free are so ductile that they may be bent sharply at temperatures as low as 32° F. without cracking and shattering. More particularly, these waxes are characterized by a needle-like microcrystalline structure which appears to impart excellent ductility to them and they are so adhesive that when spread as a film on a sheet of polished metal, the waxes will adhere to the metal and will not separate or crack off the metal when the latter is chilled to 32° F. and bent sharply. The adhesiveness and ductility of the waxes are remarkable in view of the fact that the waxes are not sticky or tacky at temperatures well above room temperature, and are substantially entirely free of oil.

As described in my Patent No. 2,123,982, granted July 19, 1938, and in accordance with the process set forth hereinafter, waxes embodying the invention may be produced from petrolatum.

A typical flow diagram of the process is illustrated in the accompanying drawing.

The petrolatum from which the wax is produced may be obtained from petroleum in any of the conventional ways. This petrolatum is collected in a storage tank from which it is withdrawn and charged to a still. In the still it is reduced by distillation with steam or a high vacuum or both to a residue consisting of about 20% to 50% of the starting stock and having a flash point of at least 500° F. Substantially all the waxes which tend to impart brittleness to the wax, when cold, and low boiling hydrocarbon oils are removed by this distillation. Sufficient steam or sufficiently high vacuum should be used so that any decomposition of the stock is minimized. When a vacuum is used for this purpose, an absolute pressure of 5–30 mm. is preferred.

The residue resulting from the steam or vacuum distillation is run to a residuum storage tank. One part of the residue is withdrawn and is heated to a temperature of approximately 180° F., plus or minus 10°, and mixed with and dissolved in approximately four to six parts of ethylene dichloride, or a mixture of solvents, such as benzol and acetone or naphtha and butanol in a mixing tank.

The solvent used, preferably ethylene dichloride, is characterized by the ability to dissolve waxes at approximately 180° F. but at a lower temperature, that is 110° F., causes precipitation of the waxes in filterable form.

The mixture of solvent, wax and some occluded oil, is agitated by suitable means while the temperature of the mixture is reduced to a predetermined point. The melting point of the final wax product depends upon the temperature to which the mixture is reduced. If, for example, it is desired to produce a wax with a melting point of 160° F., the mixture is cooled to 80° F. and maintained at this temperature over a period up to four hours, while being constantly agitated. The agitation causes formation of filterable clumps or aggregates of microcrystals of the wax which are removed in a manner hereinafter described.

The treatment in the agitating tank depends to some degree upon the condition of the charging stock. If the original stock is dark in color, approaching black, indicating the presence of a considerable proportion of asphaltic bodies, it may be advisable to maintain the conditions in the agitating tank for an extended period of time, for example, four hours or more. If the original stock is light in color, it may be treated in the tank for a much shorter time, for example, an hour, or even less. The presence of asphaltic bodies appears to retard crystal formation, thereby necessitating an increase in the length of time of agitation.

When the precipitated wax has attained a filterable form, it is passed to a filter press, for removal of the wax.

The preferred form of filter press is one having canvas or paper covered rotatable leaves enclosed in a vapor-tight case, capable of withstanding a pressure of 50 pounds per square inch, and having additional inlet nozzles adjacent the leaves of the press for a purpose later to be described.

A sufficient quantity of the mixture of crystallized wax, solvent and occluded oil is pumped into the press to deposit a layer of the wax of appreciable thickness on the leaves of the press, and the excess solvent, oil and undeposited wax is blown from the press by gas under pressure. The gas pressure is maintained in the press while clean ethylene dichloride is forced through the cake to wash and remove oil therefrom. The washing is continued until the filtrate coming from the filter press is free from oil, at which time the remainder of the solvent is blown out by the gas under pressure. It is important that during the whole filtering and washing operation, the pressure within the filter should not be allowed to drop because otherwise the cakes of wax would fall from the filter leaves, rendering washing of the wax cakes impossible.

At the conclusion of the washing and draining steps, clean ethylene dichloride is forced through the nozzles arranged adjacent the filter leaves to strip the wax cakes therefrom and mix them with the solvent. The mixture is then transferred to a still where the temperature is raised to a point sufficiently high to distill off the solvent, refluxing being used to assure a clean separation of the solvent and the wax. The residue is cooled, and if colored may be further treated in any conventional manner such as with fuller's earth, to produce a substantially colorless wax.

What occurs in the preceding process is believed to be as follows:

The distillation of the petrolatum stock to produce a bottoms having a flash point of above 500° F., eliminates the waxes causing cold brittleness and most of the lower boiling point oils in the stock, thus producing a bottoms residue which contains only waxes having high melting points and oils having high boiling points.

The fractional precipitation separates the highest melting point waxes from the bottoms fraction along with a small amount of occluded high boiling point oil. The wax precipitated when asphaltic bodies are present, may be filtered only with considerable difficulty, because the asphaltic bodies retard the formation of granular crystalline aggregates. The agitation in conjunction with the precipitation step encourages formation of the crystalline aggregates and renders the wax filterable. The washing step removes all of the occluded oil from the wax crystals. By redissolving the wax and distilling, a clean separation is produced, eliminating all of the ethylene dichloride, and permitting formation of very fine needle-like crystals in the final product.

It will thus be understood that the described process avoids the necessity of repeated crystallizations of the wax, and thus reduces not only the time required to obtain the final product, but also results in the desired feature of treating a relatively smaller amount of the original petrolatum stock with the solvents, thus rendering the process more economical. It will also be understood that the treatment of the stock will require less time, and thereby permits a greater amount of material to be treated in a given time with a consequently greater yield of product than has heretofore been possible.

The remelting and distillation steps change the crystalline structure of the wax from coarse crystalline to microcrystalline by the removal of solvent. The resulting waxes have greatly improved physical characteristics. The reduced size of the crystals causes the wax to have greater ductility over a wide temperature range probably because of inter-crystalline slippage, and for some reason not clearly understood, the wax is very adhesive over an equally wide range of temperatures.

By way of a specific embodiment of applicant's process, petrolatum obtained from the Barnsdall Refining Company was distilled to 50% bottoms, and a flash point of approximately 550° F. To one volume of the 50% bottoms were added four to six volumes of ethylene dichloride; solution of the residue in the solvent being effected at 175° F. The solution was then cooled to 80° F. and agitated to produce a filterable form of wax, then filtered and washed in a filter press having duck coverings on the leaves. After washing with ethylene dichloride, the cakes of wax were again dissolved in ethylene dichloride and the solvent then distilled leaving a wax residue.

The wax produced had a melting point of 161.5° F. and a refractive index at 176° F. of 1.4524 and when examined under a microscope, with polarized light, disclosed a fine crystalline structure, containing needle-like crystals.

A sample of this wax was melted and spread on a tin sheet, and chilled to 32° F., and upon bending of the sheet sharply, no fracture was produced in the wax coating, thereby showing that the ductility of the wax even at low temperatures was very satisfactory. Not only that, but the wax coating did not chip or flake from the sheet, thereby disclosing a property of improved adhesiveness.

Three other waxes produced from Barnsdall's petrolatum in a similar manner gave the following values:

|   | M. P. | nD 176° F. |
|---|---|---|
|   | F. |   |
| B | 158.4 | 1.4520 |
| C | 160.1 | 1.4510 |
| D | 160.7 | 1.4545 |

Other typical waxes embodying the invention which differed in their color due to the presence of varying amounts of coloring matter were tested to determine their refractive indices and also for durometer hardness in order to determine their hardness at a number of different temperatures.

The Shore durometer is an instrument which is very widely used for determining the hardness of rubber. The type of instrument used in the durometer test is the type used for ordinary soft rubber. It contains a blunt pin which is supported by a standard spring, so that if there is no give to the material tested the needle is pushed back against the spring and registers 100 on the scale on the instrument. If the material tested is plastic, the needle slowly penetrates and the hardness registered on the scale drops off from a maximum of 100.

The results of these tests are shown in the following table:

TABLE I

*Barnsdall waxes*

|  | M. P. °F. | nD 176° F. | D. H. at 113° F. | D. H. at 131° F. | 85 D. H. °F. | D. H. at 86° F. |
|---|---|---|---|---|---|---|
| White | 159.4 | 1.4475 | 40 | 12 | 32 | 70 |
| Yellow | 160.5 | 1.4495 | 36 | 10 | 32 | 63 |
| Brown | 161.2 | 1.4500 | 35 | 10 | 32 | 63 |

The results of these tests show that the waxes embodying the present invention are comparatively soft even at low temperatures despite their high melting points.

Moreover, in order to determine the hardness of the waxes on a different basis, they were tested at various temperatures with a penetrometer, an instrument commonly used for measuring the hardness of plastic materials. The results of these tests are as follows:

| Sample | Penetrations (100 grams—5 seconds) | | | | |
|---|---|---|---|---|---|
|  | 32° F. | 50° F. | 77° F. | 100° F. | 115° F. |
| White | 9 | 14 | 16 | 35 | 57 |
| Yellow | 8 | 14 | 17 | 34 | 54 |
| Brown | 9 | 14 | 18 | 35 | 61 |

My wax product disclosed herein is particularly suitable for lining metal containers for beverages and other foodstuffs. The adhesiveness of the wax permits a firm and permanent bond with the metal surface. Previously it has been difficult if not impossible to line beverage containers satisfactorily because of the tendency of the lining material to become brittle and break away from the metal surface. This allows the beverage to come in contact with the metal surface, with resulting flavor contamination. The high ductility of this wax, even at low temperatures, avoids any possibility of the wax becoming loose from the surface of a beverage container when dented, bent or subjected to a sudden blow.

It should be particularly noted that the ductility even at low temperatures is accomplished without any addition of liquid or oily materials, and thus there is no possibility of the beverage absorbing undesirable components from the wax liner. My wax is tasteless and odorless and thus ideally suited for use with food products. It should also be noted that the wax maintains its desirable characteristics even at relatively high temperatures and has a melting point in excess of 155° F. Thus, there is no melting of a wax liner made from my product when such a container is subjected to pasteurizing conditions.

I claim:

1. A high melting point petroleum wax of high ductility yet substantially oil-free and non-tacky, said wax having a melting point of at least 155°, and a durometer hardness of not more than 85 at 32° F., said wax being so ductile that a thin film thereof may be bent sharply at 32° F. without cracking and shattering.

2. A high melting point petroleum wax of high ductility yet substantially oil-free and non-tacky, said wax having a melting point of at least 155°, and a durometer hardness of not more than 85 at 32° F., said wax being so adhesive and ductile that when the wax is applied to a metallic sheet and the latter bent sharply at temperatures as low as 32° F., the wax will not crack or separate from said sheet.

3. A high melting point petroleum wax of high ductility yet substantially oil-free and non-tacky, said wax having a melting point of about 160° F., a durometer hardness of not more than 85 at 32° F. and a refractive index between about 1.4475 and 1.4545 at 176° F., said wax being so ductile that a thin film thereof may be bent sharply at temperatures as low as 32° F. without cracking.

4. A high melting point petroleum wax of high ductility yet substantially oil-free and non-tacky, said wax having a melting point of about 160° F. and a durometer hardness of not more than 85 at 32° F., said wax being so ductile that a thin film thereof may be bent sharply at temperatures as low as 32° F. without cracking.

EVERETT R. WILES.

CERTIFICATE OF CORRECTION.

Patent No. 2,306,201. December 22, 1942.

EVERETT R. WILES.

It is hereby certified that error appears in the printed specification of the above numbered patent requiring correction as follows: Page 3, Table I, 6th column thereof, for

```
"  32                    32
   32       read    --   32-   --;
   32   "                32-
``` and that the said Letters Patent should be read with this correction therein that the same may conform to the record of the case in the Patent Office.

Signed and sealed this 9th day of February, A. D. 1943.

Henry Van Arsdale,
Acting Commissioner of Patents.

(Seal)